(12) United States Patent
Takeshita

(10) Patent No.: US 12,494,486 B2
(45) Date of Patent: Dec. 9, 2025

(54) NEGATIVE ELECTRODE ACTIVE MATERIAL FOR NONAQUEOUS ELECTROLYTE SECONDARY BATTERY, AND NONAQUEOUS ELECTROLYTE SECONDARY BATTERY

(71) Applicant: Prime Planet Energy & Solutions, Inc., Tokyo (JP)

(72) Inventor: Shuhei Takeshita, Nagakute (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 555 days.

(21) Appl. No.: 17/969,684

(22) Filed: Oct. 20, 2022

(65) Prior Publication Data

US 2023/0130099 A1    Apr. 27, 2023

(30) Foreign Application Priority Data

Oct. 21, 2021 (JP) ................. 2021-172562

(51) Int. Cl.
  *H01M 4/583* (2010.01)
  *H01M 4/02* (2006.01)
  *H01M 10/0525* (2010.01)
(52) U.S. Cl.
  CPC ....... *H01M 4/583* (2013.01); *H01M 10/0525* (2013.01); *H01M 2004/021* (2013.01); *H01M 2004/027* (2013.01)
(58) Field of Classification Search
  CPC .................................................. H01M 4/583
  See application file for complete search history.

(56) References Cited

U.S. PATENT DOCUMENTS

| | | | |
|---|---|---|---|
| 2017/0040609 A1 | 2/2017 | Takahata | |
| 2018/0006304 A1 | 1/2018 | Waki et al. | |
| 2018/0076450 A1* | 3/2018 | Torita | H01M 10/0525 |
| 2020/0083536 A1 | 3/2020 | Lee et al. | |
| 2021/0184218 A1* | 6/2021 | Ahn | H01M 4/583 |

FOREIGN PATENT DOCUMENTS

| | | |
|---|---|---|
| CN | 106450267 A | 2/2017 |
| CN | 107546366 A | 1/2018 |
| CN | 111886723 A | 11/2020 |
| JP | 2004-063321 A | 2/2004 |
| JP | 4040381 B2 | 1/2008 |
| JP | 201754815 A | 3/2017 |
| JP | 2017-084660 A | 5/2017 |
| JP | 2018190501 A | 11/2018 |
| JP | 202043069 A | 3/2020 |
| JP | 2021-520038 A | 8/2021 |
| KR | 1020190134537 A | 12/2019 |

* cited by examiner

*Primary Examiner* — Brian R Ohara
(74) *Attorney, Agent, or Firm* — HAUPTMAN HAM, LLP

(57) ABSTRACT

Provided is a technique that allows curtailing decreases in the durability of a nonaqueous electrolyte secondary battery. A negative electrode active material disclosed here is a particulate negative electrode active material used in a nonaqueous electrolyte secondary battery. The negative electrode active material contains graphite particles which are aggregates of scaly graphite, and carbon black. The carbon black is present in internal voids of the graphite particles, and part of the carbon black accumulates on the surface of the graphite particles thereby forming a carbon coating portion.

14 Claims, 3 Drawing Sheets

NEGATIVE ELECTRODE ACTIVE MATERIAL FOR NONAQUEOUS ELECTROLYTE SECONDARY BATTERY, AND NONAQUEOUS ELECTROLYTE SECONDARY BATTERY

CROSS REFERENCE TO RELATED APPLICATIONS

The present application claims priority to Japanese Patent Application No. 2021-172562 filed on Oct. 21, 2021, the entire contents whereof are incorporated in the present specification by reference.

BACKGROUND OF THE DISCLOSURE

1. Technical Field

The present disclosure relates to a negative electrode active material for a nonaqueous electrolyte secondary battery, and to a nonaqueous electrolyte secondary battery.

2. Background

Nonaqueous electrolyte secondary batteries such as lithium ion secondary batteries are more lightweight and afford higher energy densities than existing batteries, and accordingly are preferably used as high-output power sources mounted on vehicles, or as power sources in personal computers and mobile terminals.

Nonaqueous electrolyte secondary batteries for such applications have an electrode body, as a power generation element, that includes a positive electrode and a negative electrode. The negative electrode has for instance a negative electrode active material layer containing a negative electrode active material, on a sheet-shaped negative electrode collector. Examples of the negative electrode active material of nonaqueous electrolyte secondary batteries include particulate graphite (graphite particles). Graphite particles in the form of spherical secondary particles resulting from aggregation of scaly graphite (primary particles) are used in Japanese Patent Application Publication No. 2018-190501, Japanese Patent Application Publication No. 2020-43069 and Japanese Patent Application Publication No. 2017-54815. The above citations propose providing a carbonaceous coating on the surface of the graphite particles.

SUMMARY OF THE INVENTION

The inventors endeavored to curtail decreases in durability of a nonaqueous electrolyte secondary battery provided with a negative electrode active material that contains graphite particles being aggregates of scaly graphite.

It is an object of the present invention, arrived at in the light of the above considerations, to provide art that allows suppressing decreases in durability of a nonaqueous electrolyte secondary battery.

The negative electrode active material disclosed herein is a particulate negative electrode active material used in a nonaqueous electrolyte secondary battery. The negative electrode active material contains graphite particles which are aggregates of scaly graphite, and carbon black. The carbon black is present in internal voids of the graphite particles, and part of the carbon black accumulates on the surface of the graphite particles thereby forming a carbon coating portion.

In a negative electrode active material having such a configuration, carbon black or a carbon coating portion formed by carbon black is present not only on the surface of graphite particles but also in internal voids. As a result, this allows maintaining good conductive paths in the negative electrode active material. It becomes therefore possible to possible to curtail decreases in the durability of the nonaqueous electrolyte secondary battery.

In another preferred implementation, the negative electrode active material disclosed herein contains the carbon black in a proportion of 1 part by weight to 10 parts by weight relative to 100 parts by weight of the graphite particles. The effect of curtailing decreases in the durability of the nonaqueous electrolyte secondary battery can be yet better brought out by virtue of such a configuration.

In another preferred implementation of the negative electrode active material disclosed herein, an average particle size ($D_{50}$) based on a laser diffraction/scattering method is from 1 μm to 30 μm. Such a configuration makes for a suitable energy density of the nonaqueous electrolyte secondary battery.

Further provided is a nonaqueous electrolyte secondary battery that contains an electrode body having a positive electrode and a negative electrode, and a nonaqueous electrolyte solution. In the nonaqueous electrolyte secondary battery disclosed herein the negative electrode contains the above negative electrode active material. An effect of curtailing decreases in durability can thus be brought out in a nonaqueous electrolyte secondary battery having such a configuration.

DETAILED DESCRIPTION OF THE PREFERRED EMBODIMENTS

Figure 1:
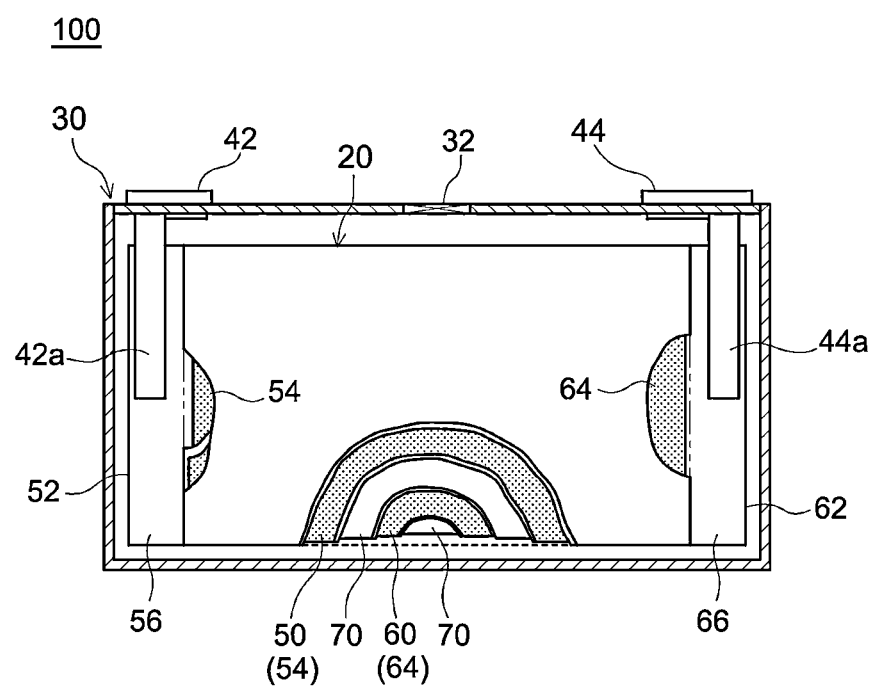
FIG. 1 is a cross-sectional diagram illustrating schematically the configuration of a nonaqueous electrolyte secondary battery according to an embodiment.

An embodiment of the nonaqueous electrolyte secondary battery disclosed herein will be explained next. Needless to say, the present invention is not meant in particular to be limited by the embodiment explained herein. Unless noted otherwise, the art disclosed herein is not limited to the embodiment that is explained. The drawings are drawn schematically, and do not necessarily reflect actual objects. Further, members and portions that elicit the same action are doted as appropriate by identical reference numerals, and a recurrent explanation thereof will be omitted. Unless otherwise specified, the notation "A to B" denoting a numerical range signifies "equal to or greater than A, and equal to or smaller than B", and encompasses "greater than A, and smaller than B".

In the present specification the term "secondary battery" denotes an electric power storage device in general in which charge and discharge reactions are elicited through movement of charge carriers across a pair of electrodes (positive electrode and negative electrode) via an electrolyte. Further, the term "nonaqueous electrolyte secondary battery" denotes a secondary battery having a nonaqueous-based electrolyte solution (nonaqueous electrolyte solution) as an electrolyte. The nonaqueous electrolyte secondary battery encompasses so-called storage batteries such as lithium ion secondary batteries, nickel-metal hydride batteries and nickel cadmium batteries, and also capacitors such as electrical double layer capacitors. The term "electrode active material" refers to a compound capable of reversibly storing and releasing a chemical species (lithium ions in a lithium ion secondary battery) as charge carriers.

As illustrated in FIG. 1, the nonaqueous electrolyte secondary battery 100 is a sealed-type battery constructed by accommodating, a flat-shaped wound electrode body 20 (hereafter, also simply referred to as "electrode body 20"), and a nonaqueous electrolyte solution not shown, in a flat square battery case 30. The battery case 30 is provided with a positive electrode terminal 42 and a negative electrode terminal 44 for external connection, and with a thin-walled safety valve 32 set to release the internal pressure of the battery case 30 when the internal pressure rises to or above a predetermined level. The battery case 30 is further provided with an injection port (not shown) for injecting the nonaqueous electrolyte solution. The positive electrode terminal 42 is electrically connected to a positive electrode collector plate 42a. The negative electrode terminal 44 is electrically connected to a negative electrode collector plate 44a. For instance a lightweight metallic material of good thermal conductivity, such as aluminum, is used as the material of the battery case 30.

Figure 2:
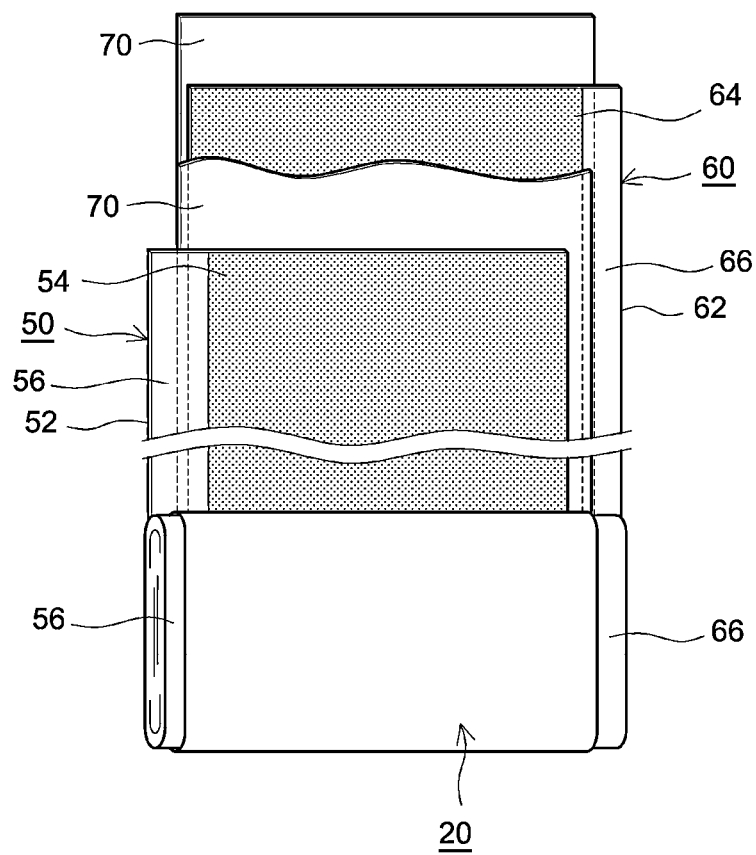
FIG. 2 is a schematic diagram for explaining the configuration of a wound electrode body according to an embodiment.

The electrode body 20 has a positive electrode and a negative electrode. As illustrated in FIG. 1 and FIG. 2, the electrode body 20 is obtained by superimposing a positive electrode sheet 50 in which a positive electrode active material layer 54 is formed along the longitudinal direction, on one or both faces (herein both faces) of an elongated positive electrode collector 52 (for instance an aluminum foil), and a negative electrode sheet 60 in which a negative electrode active material layer 64 is formed along the longitudinal direction, on one face or both faces (herein both faces) of an elongated negative electrode collector 62 (for instance a copper foil), with two elongated separator sheets 70 interposed in between, and by winding then the resulting stack in the longitudinal direction. The positive electrode collector plate 42a and the negative electrode collector plate 44a are respectively joined to a positive electrode active material layer non-formation section 56 (i.e. exposed portion of the positive electrode collector 52 at which the positive electrode active material layer 54 is not formed) and a negative electrode active material layer non-formation section 66 (i.e. exposed portion of the negative electrode collector 62 at which the negative electrode active material layer 64 is not formed) that are formed so as to respectively protrude outward from either edge of the electrode body 20 in the winding axis direction thereof (sheet width direction perpendicular to the longitudinal direction).

The positive electrode active material layer 54 contains at least a positive electrode active material. Examples of the positive electrode active material include lithium-transition metal oxides such as $LiNi_{1/3}Co_{1/3}Mn_{1/3}O_2$, $LiNiO_2$, $LiCoO_2$, $LiFeO_2$, $LiMn_2O_4$ and $LiNi_{0.5}Mn_{1.5}O_4$; and lithium-transition metal phosphate compounds such as $LiFePO_4$. The positive electrode active material layer 54 may contain components, for instance a conductive material and a binder, other than the active material. For instance carbon black such as acetylene black (AB) or some other carbon material (for example graphite) can be suitably used as the conductive material. For instance polyvinylidene fluoride (PVDF) can be used as the binder.

The negative electrode active material layer 64 contains at least a negative electrode active material. As the negative electrode active material there can be used the negative electrode active material disclosed herein.

In a case where graphite particles being aggregates of scaly graphite are used as the negative electrode active material, the scaly graphite may peel off as a result of expansion and contraction of the negative electrode active material at the time of charge and discharge of the nonaqueous electrolyte secondary battery. In an endeavor to maintain conductive paths in the negative electrode in a good state, even upon occurrence of such peeling, the inventors addressed the structure of the negative electrode active material containing the above graphite particles.

Figure 3:
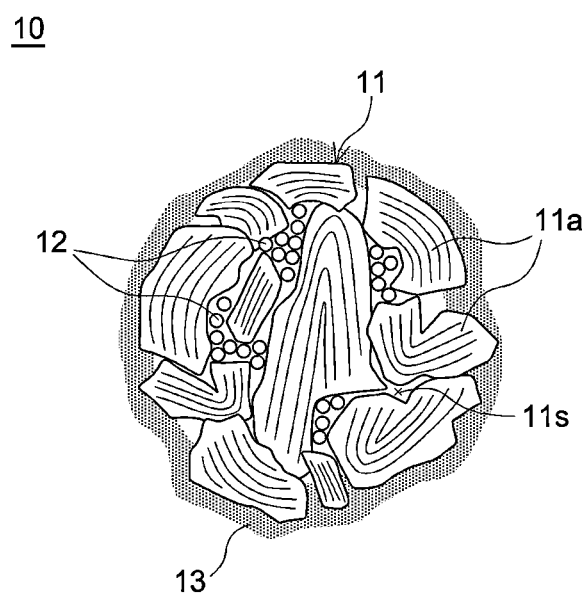
FIG. 3 is a schematic diagram for explaining the configuration of a negative electrode active material according to an embodiment.

As illustrated in FIG. 3, the shape of the negative electrode active material 10 disclosed herein is for instance a substantially spherical shape. The term "substantially spherical shape" as pertaining to the negative electrode active material 10 and the below-described graphite particles 11 signifies for instance that an average aspect ratio as measured on the basis of scanning electron microscope (SEM) lies in the range from about 1 to 2, for instance in the range from 1 to 1.5. To measure the average aspect ratio, for instance firstly multiple (for instance 2 or more) observation images (for instance surface SEM observation images of the negative electrode active material) are acquired, using a SEM, whereupon 50 or more negative electrode active material particles are extracted from the plurality of observation images. Next, a length 'a' of minor axis and a length 'b' of major axis in the smallest circumscribed rectangle of each extracted particle are acquired, and a ratio (b/a) is calculated. The arithmetic mean value of the ratios (b/a) calculated as described above is taken as the average aspect ratio.

The average particle size ($D_{50}$) of the negative electrode active material 10 can lie in the range of 1 μm to 30 μm. The term "average particle size ($D_{50}$) as pertaining to the negative electrode active material 10 signifies an average particle size (50% volume average particle size) at a cumulative value of 50% in a volume-basis particle size distribution measured using a particle size distribution measuring device based on a laser scattering/diffractometry method. A preferred degree of filling of the negative electrode active material 10 into the negative electrode active material layer 64 can be achieved herein by virtue of the fact that the average particle size ($D_{50}$) lies in the above range. A preferred energy density can likewise be realized.

As illustrated in FIG. 3, the negative electrode active material 10 has graphite particles 11. The graphite particles 11 are aggregates of scale-like (thin plate-like) scaly (flakey) graphite 11a. As illustrated in FIG. 3, the graphite particles 11 adopt a form of secondary particles formed through aggregation of scaly graphite 11a as primary particles. In the interior of the graphite particles 11 there are formed internal voids 11s between portions of the scaly graphite 11a. The shape of the graphite particles 11 is for instance substantially spherical.

As illustrated in FIG. 3, the negative electrode active material 10 has carbon black 12. The carbon black 12 is present in the internal voids his of the graphite particles 11. The form in which such carbon black is present can be ascertained for instance by observing, using a SEM, a cross section of the negative electrode active material 10. Although not particularly limited thereto, the average particle size of the carbon black 12 based on a SEM observation can be from 10 nm to 1 μm (for instance 500 nm or less, or 200 nm or less).

The carbon black 12 is not particularly limited, but preferably there are used various kinds of carbon black exhibiting good conductivity. Examples of such carbon black include acetylene black (AB), Ketjen black (registered trademark) and furnace black (oil furnace black and gas furnace black). Among the foregoing acetylene black (AB) is preferably used, from the viewpoint of versatility. Herein Ketjen black (registered trademark) is preferably used from the viewpoint of allowing carbon black to be dispersed efficiently at the time of mixing with graphite particles in the production of the negative electrode active material. Ketjen black (registered trademark) is a kind of oil furnace carbon that has a hollow shell shape. Various products sold as "Ketjen Black" by Lion Specialty Chemicals Co., Ltd. can be used, without particular limitations, as Ketjen black (registered trademark). The carbon black may be used singly or in combinations of two or more kinds.

Part of the carbon black 12 accumulates on the surface of the graphite particles 11, to form the carbon coating portion 13. The carbon coating portion 13 is for instance made up of a coating material made up of amorphous carbon. Although not illustrated in detail, when observing the negative electrode active material 10 by SEM, it can be found that the carbon coating portion 13 is formed on at least part (for instance 70% or more, 80% or more, 90% or more, or 95% or more) of the surface of the graphite particles 11. The larger the surface area of formation of the carbon coating portion 13, the more preferable it is in terms of bringing out the effect of the art disclosed herein. The formation area ratio of the carbon coating portion on the surface of the graphite particles can be calculated for instance by analyzing a surface SEM observation image of the negative electrode active material using commercially available image analysis software. For instance, multiple (for instance two or more) surface SEM observation images are acquired, and 50 or more negative electrode active material particles are randomly extracted from the plurality of surface SEM observation images. Next, the surface of each negative electrode active material particle is binarized and divided into formation sites and non-formation sites of the carbon coating portion, and the area ratio of the formation sites of the carbon coating portion is calculated. An arithmetic mean value of the area ratios calculated in this way is acquired and can be used as the formation area ratio of the carbon coating portion in the negative electrode active material.

The average thickness of the carbon coating portion 13 is not particularly limited, but is for instance from 1 nm to 50 nm. The average thickness of the carbon coating portion 13 can be measured by analyzing cross-sectional SEM observation images of the negative electrode active material using commercially available image analysis software. For instance multiple (for example two or more) cross-sectional SEM observation images are acquired, and there are calculated the thicknesses of 50 or more carbon coating portions randomly extracted from the plurality of cross-sectional SEM observation images. The calculated average value of the thickness of the carbon coating portion is acquired, and can be used as the average thickness of the carbon coating portion. The average thickness of the carbon coating portion 13 can also be measured by acquiring cross-sectional observation images of the negative electrode active material using a transmission electron microscope (TEM), instead of a SEM.

The negative electrode active material 10 may contain carbon black in a proportion of 0.5 parts by weight to 15 parts by weight relative to 100 parts by weight of graphite particles. By incorporating carbon black in such a proportion, an appropriate amount of carbon black 12 can be arranged in the voids 11s, and an appropriate amount of carbon coating portion 13 can be accordingly formed. From the viewpoint of better bringing out the effect of the art disclosed herein, the above proportion ranges preferably from 1 part by weight to 10 parts by weight, and more preferably 3 parts by weight to 8 parts by weight. The proportion of carbon black relative to the graphite particles is defined by for instance the mixing ratio of the graphite particles and carbon black as starting materials in the production of the negative electrode active material. Alternatively, the mixing ratio may be calculated by analyzing cross-sectional SEM observation images of the negative electrode active material. Such a method allows calculating the mixing ratio by analyzing cross-sectional SEM observation images of the negative electrode active material using commercially available image analysis software. For instance, multiple (for instance two or more) cross-sectional SEM observation images are acquired, and 50 or more negative electrode active material particles are randomly extracted from the plurality of cross-sectional SEM observation images. Next, each negative electrode active material particle is binarized and divided into a carbon coating portion and carbon black, and into graphite particles, and the area ratio of the carbon coating portion and carbon black is calculated. The above mixing ratio can be calculated from such an area ratio. Carbon black and graphite particles have mutually different specific gravities. The carbon black and the carbon coating portion, and the graphite particles, can therefore be binarized using the image analysis software, as described above.

The negative electrode active material disclosed herein can be produced for instance as follows. Firstly, graphite particles and carbon black as starting materials are prepared. Next, the graphite particles and carbon black are charged into a mechanochemical apparatus. A mechanochemical treatment is performed next under predetermined conditions. The negative electrode active material disclosed herein can be produced as a result. An example of a method for producing a negative electrode active material will be explained in detail in examples described further on. The above two starting materials may be charged individually into the mechanochemical apparatus. Alternatively, the above two starting materials may be charged into the mechanochemical apparatus in a state of a mixed powder resulting from mixing of the foregoing beforehand.

To produce the negative electrode active material disclosed herein, a mechanochemical apparatus of rolling flow type is preferably used as the above mechanochemical apparatus. The mechanochemical apparatus ("Multipurpose mixer" by Nippon Coke & Engineering Co., Ltd.) used in the examples described below is a preferred example of such a mechanochemical apparatus of rolling flow type. Information on the configuration of the "Multipurpose Mixer" can be sourced by accessing the website of Nippon Coke & Engineering Co., Ltd. (https://www.nc-kakouki.co.jp/products-detail/mp-mixer/).

An explanation follows next on the mechanism by which the negative electrode active material disclosed herein is produced using mechanochemical apparatus of rolling flow type. Such a mechanism is not meant to be limited to the features described below. After the starting materials are charged into the mechanochemical apparatus, a stirring blade of the mechanochemical apparatus is caused to rotate at a predetermined rotational speed (10,000 rpm in the below-described examples), whereupon the graphite particles collide against the rotating stirring blade. Shear forces are generated, as the stirring blade rotates, at the interface between the graphite particles and the stirring blade. On account of such shear forces the carbon black adheres to the surface of the graphite particles and intrudes into the internal voids of the graphite particles.

By continuing the mechanochemical treatment, adhesion of carbon black to the surface of the graphite particles progresses and a powder layer becomes formed that is made up of carbon black. As the powder layer is further acted upon by shear forces generated by the rotation of the stirring blade, the powder layer becomes smoothed along the surface of the graphite particles. The powder layer yields a uniform coating layer as a result (carbon coating portion 13 in FIG. 3).

By using a mechanochemical apparatus of rolling flow type, the graphite particles can fly in the direction in which stress is received from the rotating stirring blade. Depending on the type of the mechanochemical apparatus, a load may be exerted such that the graphite particles are crushed; however, such a load is unlikely to occur in a mechanochemical apparatus of rolling flow type. By using therefore a mechanochemical apparatus of rolling flow type it becomes accordingly possible to suppress breakage of the graphite particles, and suppress formation of highly reactive new surfaces on the particles. Thus, the graphite particles can be processed in a mechanochemical treatment using a mechanochemical apparatus of rolling flow type, while deformation of the particles is suppressed; by extension, it becomes possible to suppress decreases in the durability of the nonaqueous electrolyte secondary battery (for instance decreases in capacity retention rate).

The mechanochemical apparatus of rolling flow type has a structure such that convection is brought about in the interior of the apparatus. As a result it becomes possible to uniformly elicit flow of powder inputted into the apparatus. A uniform coating layer can thus be formed on the surface of graphite particles.

The negative electrode active material 10 disclosed herein contains graphite particles 11 which are aggregates of scaly graphite 11a, and carbon black 12. By containing carbon black 12, the negative electrode active material 10 exhibits increased conductivity. The carbon black 12 is present in the internal voids 11s of the graphite particles 11, while part of the carbon black 12 accumulates on the surface of the graphite particles 11, thereby forming the carbon coating portion 13. In the negative electrode active material 10 the carbon black 12 or the carbon coating portion 13 formed by the carbon black 12 is present not only on the surface of the graphite particles 11 but also in the internal voids 11s, and hence conductive paths can be maintained even upon peeling of part of the scaly graphite 11a that makes up the graphite particles 11. Reaction activity on the surface is reduced by virtue of the fact that the carbon coating portion 13 is formed on the surface of the graphite particles 11; as a result, it becomes possible to curtail decreases in the durability of the nonaqueous electrolyte secondary battery (for instance decreases in capacity retention rate).

The negative electrode active material layer 64 may contain, in addition to the above negative electrode active material, also components other than the active material, for instance a binder, a thickener and the like. For instance styrene butadiene rubber (SBR) can be used as the binder. For instance carboxymethyl cellulose (CMC) or methyl cellulose (MC) can be used as the thickener. Further, the negative electrode active material layer 64 may further contain a conductive material. For instance carbon black such as acetylene black (AB) can be used as the conductive material.

Examples of the separator 70 include porous sheets (films) made up of a resin such as polyethylene (PE), polypropylene (PP), polyester, cellulose or polyamide. The porous sheet may have a single-layer structure or a multi-layer structure of two or more layers (for instance a three-layer structure in which PP layers are laid up on both sides of a PE layer). A heat resistant layer (HRL) may be provided on the surface of the separator 70.

The nonaqueous electrolyte solution contains for instance a nonaqueous solvent and a supporting salt. As the nonaqueous solvent and the supporting salt there can be used, without particular limitations, various solvents and supporting salts used in electrolyte solutions of this kind of nonaqueous electrolyte secondary batteries. Examples of the nonaqueous solvent include ethylene carbonate (EC), diethyl carbonate (DEC), dimethyl carbonate (DMC), ethyl methyl carbonate (EMC), monofluoroethylene carbonate (MFEC), difluoroethylene carbonate (DFEC), monofluoromethyl difluoromethyl carbonate (F-DMC), trifluorodimethyl carbonate (TFDMC) and the like. Such nonaqueous solvents can be used singly or in combinations of two or more kinds. For instance a lithium salt such as $LiPF_6$, $LiBF_4$ or $LiClO_4$ (preferably $LiPF_6$) can be used as the supporting salt. The concentration of the supporting salt may be set to lie in the range from 0.7 mol/L to 1.3 mol/L. The nonaqueous electrolyte solution may further contain conventionally known additives such as various coating film forming agents, thickeners and dispersants.

As described above, the negative electrode active material 10 disclosed herein has the effect of suppressing decreases in the durability of the nonaqueous electrolyte secondary battery. Accordingly, an effect of suppressing a decrease in the durability of the nonaqueous electrolyte secondary battery 100 can be achieved by incorporating the negative electrode active material 10 into the negative electrode sheet 60 of the nonaqueous electrolyte secondary battery.

The nonaqueous electrolyte secondary battery 100 can be used in various applications. Suitable applications include drive power sources mounted on vehicles such as electric vehicles (BEVs), hybrid electric vehicles (HEVs) and plug-in hybrid vehicles (PHEVs). The nonaqueous electrolyte secondary battery 100 can also be used as a storage battery for small power storage devices or the like. The nonaqueous electrolyte secondary battery 100 can further be used for instance in the form of an assembled battery in which multiple nonaqueous electrolyte secondary batteries 100 are connected to each other in series and/or in parallel.

A square nonaqueous electrolyte secondary battery 100 provided with a flat-shaped wound electrode body has been explained as an example. However, the nonaqueous electrolyte secondary battery may be configured in the form of a nonaqueous electrolyte secondary battery provided with a stacked electrode body (i.e. an electrode body resulting from alternate stacking of a plurality of positive electrodes and a plurality of negative electrodes).

EXAMPLES

Examples pertaining to the present invention will be explained next, but the present invention is not meant to be limited to the examples.

Production of a Negative Electrode Active Material

Example 1

Spheroidized graphite (spheroidal graphite) ("SG-BH8" produced by Ito Graphite Co., Ltd.), which is an aggregate of scaly graphite, was prepared as the graphite particles. As the carbon black there was prepared Ketjen black ("EC600JD" by Lion Specialty Chemicals Co., Ltd.). The spheroidized graphite and the Ketjen black were charged into a mechanochemical apparatus ("Multipurpose Mixer" by Nippon Coke & Engineering Co., Ltd.), and a mechanochemical treatment was carried out. The rotational speed in such a mechanochemical treatment was 10,000 rpm, and the treatment time was 1 hour. The input amount of spheroidized graphite was 200 g. There were used 0.8 parts by weight of Ketjen black relative to 100 parts by weight of spheroidized graphite. The negative electrode active material according to Example 1 was produced as a result.

Examples 2 to 7

Herein Ketjen black was used in the amounts given in "Ratio by weight (parts by weight)" in Table 1, relative to 100 parts by weight of spheroidized graphite. Otherwise, the negative electrode active materials of the respective examples were prepared using the same materials, and in accordance with the same procedure, as in Example 1.

Example 8

Acetylene black ("Li-100" by Denka Co., Ltd.) was prepared in lieu of Ketjen black. Herein there were used 5 parts by weight of acetylene black relative to 100 parts by weight of spheroidized graphite. Otherwise, the negative electrode active material according to the present example was prepared using the same materials, and in accordance with the same procedure, as in Example 1.

Example 9

No carbon black was used herein. Otherwise, the negative electrode active material according to the present example was prepared using the same materials, and in accordance with the same procedure, as in Example 1. The symbol "–" in the column of "Carbon black" and the column of "Ratio by weight (parts by weight)" in Table 1 indicates that that no carbon black was used.

Production of a Nonaqueous Electrolyte Secondary Battery

A slurry for positive electrode active material layer formation was prepared by mixing $LiNi_{1/3}Co_{1/3}Mn_{1/3}O_2$ (NCM) as a positive electrode active material, acetylene black (AB) as a conductive material, and polyvinylidene fluoride (PVdF) as a binder at a ratio by weight of NCM:AB:PVdF=92:5:3, in N-methylpyrrolidone (NMP). This slurry was applied to both sides of an elongated sheet-shaped aluminum foil (thickness 15 µm) as a positive electrode collector, was dried, and was thereafter pressed with a roll press, to prepare a sheet-shaped positive electrode.

The negative electrode active materials produced according to the respective examples were used as the negative electrode active material. Respective slurries for negative electrode active material layer formation were prepared by mixing each negative electrode active material above, styrene butadiene rubber (SBR) as a binder, and carboxymethyl cellulose (CMC) as a thickener, at a solids ratio of negative electrode active material:SBR:CMC=99:0.5:0.5, in ion-exchanged water. Each slurry was applied to both faces of an elongated sheet-shaped copper foil (thickness 10 µm) as a negative electrode collector, was dried, and was thereafter pressed with a roll press, to thereby produce a respective sheet-shaped negative electrode.

A porous polyolefin sheet (thickness 24 µm) having a three-layer structure of PP/PE/PP was used as the separator. This separator had a heat-resistant layer (HRL) (thickness 4 µm) on the side of the porous polyolefin sheet opposing the positive electrode.

Each negative electrode and the positive electrode were laid up via the separator, and the whole was wound in the longitudinal direction, to produce a wound electrode body. Next, collector plates of polarity identical to those of respective poles were attached to the wound electrode body, and the whole was accommodated in a battery case. Then a predetermined amount of nonaqueous electrolyte solution was injected through an injection hole of the battery case. A solution resulting from dissolving $LiPF_6$ as a supporting salt, to a concentration of 1.0 mol/L in a mixed solvent of ethylene carbonate (EC), dimethyl carbonate (DMC) and ethyl methyl carbonate (EMC), at a volume ratio of 30:30:40, was used as the nonaqueous electrolyte solution.

After injection of the nonaqueous electrolyte solution, a sealing member was attached to the injection hole, and the battery case was sealed. Thereafter, the battery was allowed to stand for a predetermined lapse of time, to impregnate the wound electrode body with the nonaqueous electrolyte solution. The resulting batteries were charged under predetermined conditions, and thereafter an aging treatment was performed at 60° C., to produce nonaqueous electrolyte secondary batteries for evaluation according to the respective examples.

Cycle Test

The capacity (initial capacity) of each nonaqueous electrolyte secondary battery for evaluation was measured. Each nonaqueous electrolyte secondary battery for evaluation was placed in a temperature environment of 40° C., was charged at constant current, at a current value of 2C, from SOC 0% to SOC 100%, followed by discharge at constant current, at a current value of 2C, from SOC 100% to SOC 0%; this charge and discharge cycle was performed over 500 cycles. The capacity of each nonaqueous electrolyte secondary battery for evaluation after 500 cycles was measured, and a value worked out using expression (1) below $$\text{Capacity retention rate (\%)}=(\text{capacity after 500 cycles/initial capacity})\times 100 \quad (1)$$

was taken as the capacity retention rate (%) in the respective example. The results are set out in the corresponding columns of Table 1.

The evaluation criteria for the durability of the nonaqueous electrolyte secondary batteries for evaluation are as follows. Evaluation rankings of the respective examples are given in the corresponding column of Table 1.

E (excellent durability): capacity retention rate, after a cycle test, of 80% or higher G (good durability): capacity retention rate, after a cycle test, from 60% to less than 80%

P (poor durability): capacity retention rate, after a cycle test, of less than 60%

TABLE 1

| | Carbon black | Ratio by weight (parts by weight) | Capacity retention rate (%) | Evaluation |
|---|---|---|---|---|
| Example 1 | Ketjen black | 0.8 | 65 | G |
| Example 2 | | 1 | 81 | E |
| Example 3 | | 3 | 85 | E |
| Example 4 | | 5 | 86 | E |
| Example 5 | | 8 | 85 | E |
| Example 6 | | 10 | 81 | E |
| Example 7 | | 11 | 69 | G |
| Example 8 | Acetylene black | 5 | 82 | E |
| Example 9 | — | — | 52 | P |

The results set out in Table 1 revealed that decreases in durability of a nonaqueous electrolyte secondary battery can be suppressed by using a particulate negative electrode active material that is utilized in the nonaqueous electrolyte secondary battery, wherein the negative electrode active material contains graphite particles which are aggregates of scaly graphite, and carbon black, such that the carbon black is present in internal voids of the graphite particles, and part of the carbon black accumulates on the surface of the graphite particles, thereby forming a carbon coating portion.

It was found that the effect of curtailing decreases in the durability of the nonaqueous electrolyte secondary battery could be made more pronounced through the use of a negative electrode active material containing 1 part by weight to 10 parts by weight of carbon black relative to 100 parts by weight of graphite particles.

Concrete examples of the present invention have been explained in detail above, but the examples are merely illustrative in nature, and are not meant to limit the scope of the claims in any way. The art set forth in the claims encompasses various alterations and modifications of the concrete examples illustrated above.

What is claimed is:

1. A particulate negative electrode active material used in a nonaqueous electrolyte secondary battery, the negative electrode active material comprising:
    graphite particles which are aggregates of scaly graphite; and
    carbon black;
wherein
    the carbon black is present in internal voids of the graphite particles,
    part of the carbon black accumulates on surfaces of the graphite particles and forms a carbon coating portion,
    the carbon coating portion consists of the carbon black, and
    when observing the negative electrode active material by scanning electron microscope (SEM), the carbon coating portion is formed on 70% or more of the surfaces of the graphite particles.

2. The negative electrode active material according to claim 1, containing the carbon black in a proportion of 1 part by weight or more and 10 parts by weight or less relative to 100 parts by weight of the graphite particles.

3. The negative electrode active material according to claim 1, having an average particle size ($D_{50}$), based on a laser diffraction/scattering method, of 1 μm or more and 30 μm or less.

4. The negative electrode active material according to claim 1, wherein
    the carbon coating portion is amorphous.

5. The negative electrode active material according to claim 1, wherein
    when observing the negative electrode active material by SEM, the carbon coating portion is formed on 95% or more of the surfaces of the graphite particles.

6. The negative electrode active material according to claim 1, wherein the negative electrode active material consists of:
    the graphite particles; and
    the carbon black.

7. The negative electrode active material according to claim 6,
    the carbon coating portion is amorphous.

8. A nonaqueous electrolyte secondary battery, comprising:
    an electrode body comprising a positive electrode and a negative electrode; and
    a nonaqueous electrolyte solution,
wherein
    the negative electrode comprises a negative electrode active material comprising:
        graphite particles which are aggregates of scaly graphite; and
        carbon black,
    the carbon black is present in internal voids of the graphite particles,
    part of the carbon black accumulates on surfaces of the graphite particles and forms a carbon coating portion,
    the carbon coating portion consists of the carbon black, and
    when observing the negative electrode active material by scanning electron microscope (SEM), the carbon coating portion is formed on 70% or more of the surfaces of the graphite particles.

9. The nonaqueous electrolyte secondary battery according to claim 8, wherein
    the negative electrode active material contains the carbon black in a proportion of 1 part by weight or more and 10 parts by weight or less relative to 100 parts by weight of the graphite particles.

10. The nonaqueous electrolyte secondary battery according to claim 8, wherein
    the negative electrode active material has an average particle size ($D_{50}$), based on a laser diffraction/scattering method, of 1 μm or more and 30 μm or less.

11. The nonaqueous electrolyte secondary battery according to claim 8, wherein
    the carbon coating portion is amorphous.

12. The nonaqueous electrolyte secondary battery according to claim 8, wherein
    when observing the negative electrode active material by SEM, the carbon coating portion is formed on 95% or more of the surfaces of the graphite particles.

13. The nonaqueous electrolyte secondary battery according to claim 8, wherein the negative electrode active material consists of:
    the graphite particles; and
    the carbon black.

14. The nonaqueous electrolyte secondary battery according to claim 13, wherein
    the carbon coating portion is amorphous.

* * * * *